Figure 1:
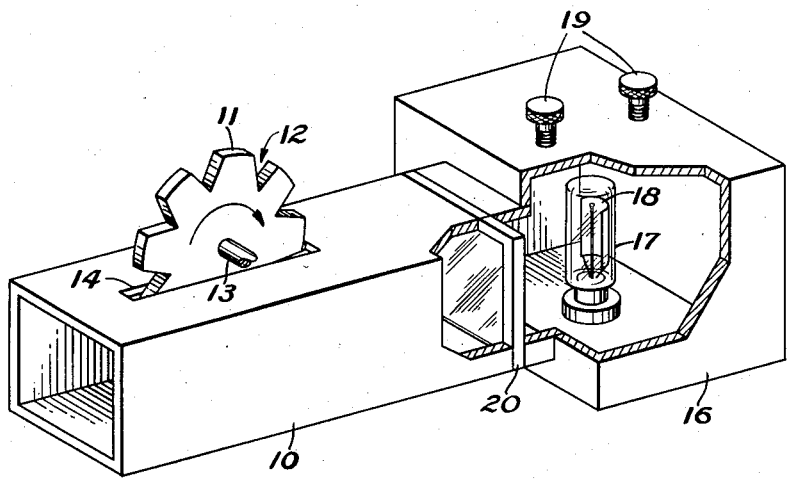

Aug. 25, 1959            V. W. BOLIE            2,901,700

LOW LEVEL MICROWAVE POWER METER

Filed May 22, 1956

INVENTOR.
VICTOR W. BOLIE
BY
Moody & Holmbacher
ATTORNEYS

United States Patent Office 2,901,700
Patented Aug. 25, 1959

2,901,700

LOW LEVEL MICROWAVE POWER METER

Victor W. Bolie, Cedar Rapids, Iowa, assignor to Collins Radio Company, Cedar Rapids, Iowa, a corporation of Iowa Application May 22, 1956, Serial No. 586,405

2 Claims. (Cl. 324—95)

This invention relates to power meters and more particularly to meters usable for the measurement of microwave power at low level.

Prior techniques for the measurement of microwave power have encompassed crystal detectors, thermistors, and bolometers. Unfortunately, none of these devices are capable of measuring microwave power below the level of about ten microwatts.

It is the object of this invention to provide a means for measuring electromagnetic radiation at low power levels.

It is a further object of this invention to provide a means for the measurement of low level electromagnetic power in the microwave frequency regions.

It is a feature of the invention that the dark current dependent on the absolute temperature of the photocathode of a photocell is utilized in making the power measurement.

It is a further feature that the invention is particularly adapted to the microwave frequency range where waveguide circuitry can be used.

Figure 2:
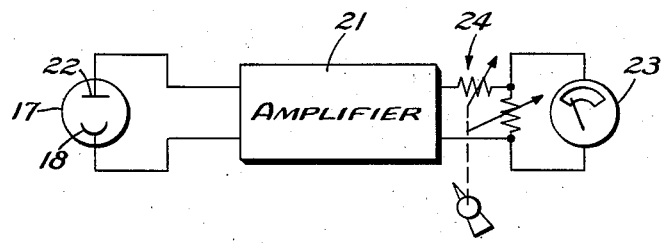

Further objects, features, and advantages of the invention will become apparent from the following description and claims when read in conjunction with the drawing, in which:

Figure 1 shows a perspective view of the device with a portion of the waveguide and photocell housing broken away, and Figure 2 shows the electrical circuit diagram.

Figure 1 shows a device adapted for attachment to the waveguide containing the source of energy to be measured. A waveguide 10 has the same size as the source waveguide. A notched modulating disc or chopper 11, having notches 12 therein, is inserted in a longitudinal slot 14 in the waveguide so that a portion of the periphery of the disc is within the waveguide. This notched disc is utilized as a modulator of the electromagnetic radiation in the waveguide. Modulation arises when the notched disc is rotated about a shaft 13; the disc is rotated by motor means, not illustrated.

A chamber 16 terminates the end of the waveguide section 10. Mounted within this chamber is a phototube 17 with the photocathode 18 arranged to receive radiation entering cavity 16 from waveguide 10. The photocathode must have as low a thermal mass as possible in order to insure a satisfactorily quick response to energy level variations. The envelope of the photocell is transparent to the electromagnetic radiation being sensed.

Intermediate of chamber 16 and waveguide 10 is a filter 20. This filter is opaque to frequencies from the infrared up, especially to the infrared and the visible spectrum, but passes electromagnetic energy of frequencies lower than the infrared including specifically the microwave energy conducted by the waveguide 10. The chamber 16 is opaque to all radiation and is typically composed of metal with low loss silver plating coating on the inside walls.

For exceedingly precise measurements the temperature of the cavity is closely regulated. For greater sensitivity to very low level radiation the entire cavity is cooled, by immersion, for example, in liquid helium, to reduce the basic dark current of the photocell. It is well known that the photocell dark current increases by factors of ten rather rapidly from near absolute zero temperatures; operation of the phototube thus, at exceedingly low temperatures enhances its sensitivity greatly.

Tuning stubs 19 are provided to adjust the tuning of the chamber 16 for a good matching as a termination of the waveguide. The placement of the tuning stubs and the arrangement of the chamber, taking into account the effect of the photocell, are adjusted to provide as perfect a termination as possible.

Figure 2 shows the electrical circuit diagram of the device. Phototube 17 is connected to amplifier 21. The photocathode 18 and anode 22 are connected through the usual bias circuits to the input circuit of the amplifier. The amplifier is a stabilized amplifier having high gain at the frequency at which chopper 11 modulates the waveguide 10. Amplifier 21 may be a tuned, feed-back stabilized amplifier where the frequency of the modulation is relatively stable, since the narrower the band width of the amplifier, the higher the signal to noise ratio and consequently the higher the usable sensitivity. Silver-oxygen-cesium cathode photocells have dark currents of the order of $10^{-9}$ amperes at normal room temperatures. Sensitivity of rectifier type meters is in the order of $10^{-4}$ amperes. The gain of amplifier 21 working between these two elements then must have a gain of at least $10^6$.

Amplifier 21 has a variable attenuator 24 connected between its output and rectifier type meter 23. This attenuator is calibrated as well as the meter 23 to give the range of measurements greater flexibility. While meter 23 is a rectifier type D'Arsonval movement meter, any indicator of alternating current may be used, as long as the frequency response and sensitivity of the meter is adequate at the frequency of the modulation introduced by chopper wheel 11.

In operation, the chopper 11 modulates the electromagnetic energy present in the waveguide 10. The filter 20 blocks visible and infrared radiation, passing the microwave electromagnetic energy. Microwave power thus incident upon the photocathode 18 raises its temperature. This change in temperature produces a change in the thermionic dark current of the photocell. With the chopper period longer than the thermal response of the photocathode, a modulated change of current occurs in the dark current of the photocell. This alternating current change is translated into voltage in the bias circuits and amplified by amplifier 21. As noted above, a high order of gain is necessary to raise the small variation in dark current to a level high enough to energize meter 23. Since the dark current of the photocell is dependent on temperature, increase of the quantity of incident electromagnetic energy increases the amplitude of the alternating current output. Thus, the device is responsive to low power levels; its response to changes in magnitude thereof is a definite function of the magnitude, capable of calibration for the specific circuit elements employed.

The chopper, while shown as a common in the art rotating notched disc, may also be other forms of waveguide switch, such as a gas tube pulsed on and off or a Faraday type rotator using magnetically excited ferrite materials. The modulator is used to modulate the incident microwave radiation impinging on cathode 18 so that the increase of dark current is more easily amplified.

Although this invention has been described with reference to particular embodiments thereof, it is not to be so limited because changes and modifications may be made therein which are within the full intended scope of the invention as defined by the appended claims.

I claim:
1. A low level microwave power meter comprising a waveguide, a resonant cavity connected to receive energy from said waveguide, a photocell mounted in said resonant cavity, a filter interposed between said waveguide and said resonant cavity, said filter blocking electromagnetic energy which has a frequency higher than one million megacycles per second, and chopper means associated with said waveguide for modulating the electromagnetic energy carried therein.

2. A low level power meter for measuring electromagnetic energy comprising means for conducting said electromagnetic energy, means for modulating said electromagnetic energy, said modulating means being associated with said conducting means, filter means for transmitting electromagnetic energy which has a frequency below infrared frequencies, a photocell, an enclosure for said photocell, said enclosure blocking off all of the electromagnetic radiation, said filter means forming a window in said enclosure between said conducting means and said photocell, whereby an alternating current of the frequency of said modulating means arises as a function of the microwave power incident on said phototube.

References Cited in the file of this patent
UNITED STATES PATENTS

| | | |
|---|---|---|
| 2,496,879 | Lafferty | Feb. 7, 1950 |
| 2,520,604 | Linder | Aug. 29, 1950 |
| 2,692,950 | Wallace | Oct. 26, 1954 |
| 2,735,982 | Gunn | Feb. 21, 1956 |